July 17, 1956  W. F. FRENCH  2,754,634
TOOTH RESTS FOR CUTTER GRINDERS

Filed April 19, 1955  2 Sheets-Sheet 1

WARREN F. FRENCH
INVENTOR

BY W. Russell Greenwood
ATTORNEY

July 17, 1956 W. F. FRENCH 2,754,634
TOOTH RESTS FOR CUTTER GRINDERS
Filed April 19, 1955 2 Sheets-Sheet 2
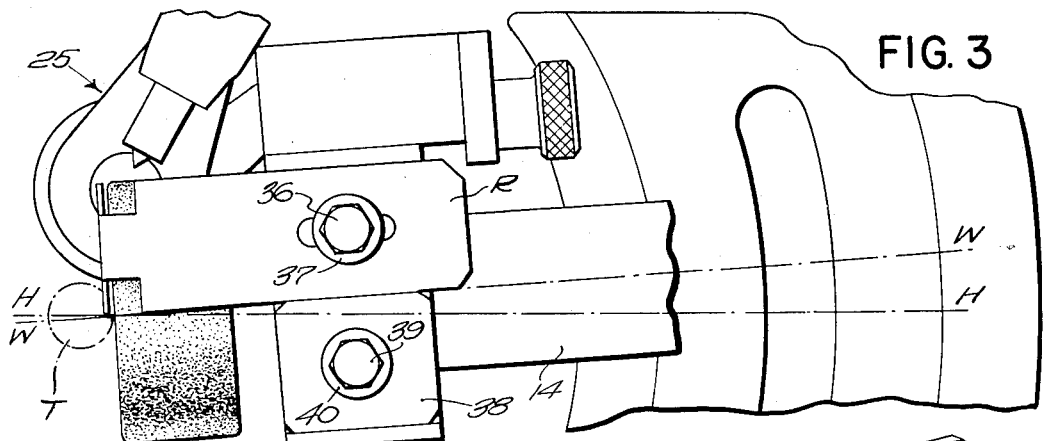
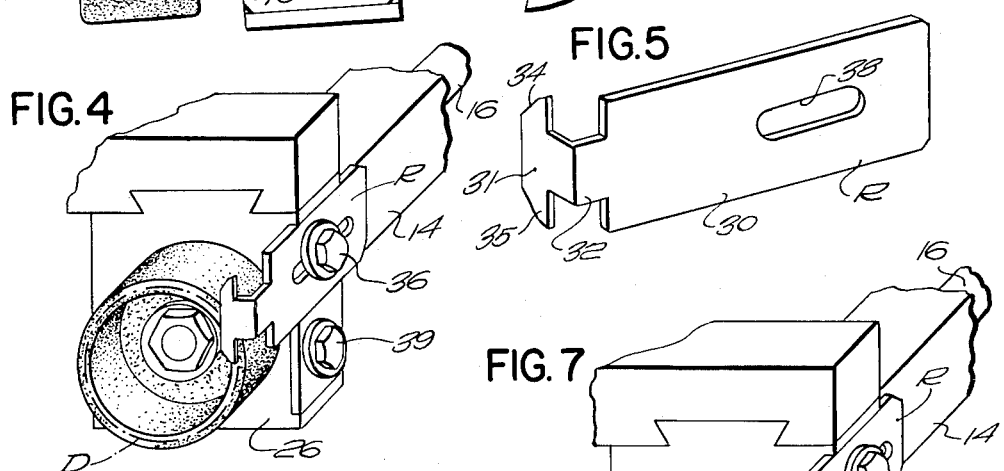
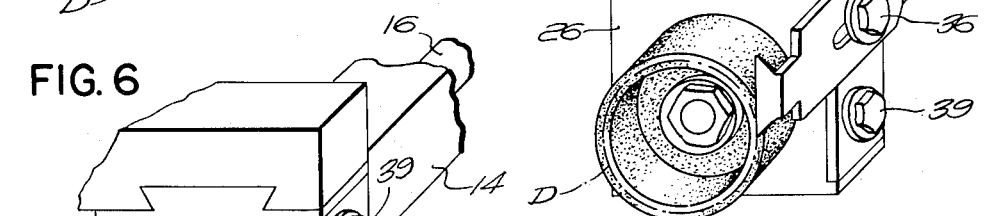
WARREN F. FRENCH
INVENTOR
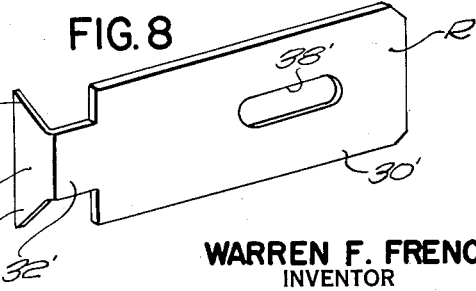
ATTORNEY United States Patent Office 2,754,634
Patented July 17, 1956

2,754,634

TOOTH RESTS FOR CUTTER GRINDERS

Warren F. French, Brockton, Mass., assignor to William H. Field Co., Inc., Boston, Mass., a corporation of Massachusetts Application April 19, 1955, Serial No. 502,365

8 Claims. (Cl. 51—123)

This invention relates to cutter grinders and, more particularly, to a novel tooth rest arrangement for use in grinding machines of this class for supporting and guiding the cutting edges of helical or straight fluted cutting tools during a grinding operation either to sharpen or to shape such cutting edges thereof. The invention has particular adaptation for utilization with the cutter grinder disclosed in detail in my copending application, Serial No. 470,207, filed November 22, 1954, and the embodiment of the invention here selected for purposes of illustration will be described with reference to its use in such a cutter grinding machine; but it is to be understood that the present disclosure is by way of illustration, it not being intended to limit the invention to this particular use since it is susceptible of other embodiments than that herein shown.

One of the objects of the present invention is to provide a novel tooth rest arrangement for cutter grinders so constructed as to permit the optional mounting of rests with various types of guide fingers adaptable for use in the grinding of helical cutters with left and right hand helix angles, and in which the support means for the rest will effect the accurate setting of the rest and its guide finger with respect to the grinding wheel.

Another object of the invention is to provide a novel tooth rest arrangement for cutter grinders in which the support means for the rest includes a spacer element contiguous with the rest and interchangeable therewith, and is so constructed as to permit interchange of rests of different but identical length guide fingers in either of the alternative positions of the rest.

A further object of the invention is to provide a tooth rest arrangement for grinding machines of this class which is of simple construction and in which the support means for the rest enables accurate setting of the guide finger of the rest relative to the cutting tool and the grinding wheel for correct grinding of the cutting edges of the tool and in which said setting is retained regardless of tool sizes or of changes made in adjustment of the grinding wheel and/or of the tool.

Other objects and advantages will become apparent from the following description taken in connection with the accompanying drawings, in which:

Fig. 3 is a side elevational view similar to that shown in Fig. 2 but with the mounting positions of the tooth rest member and its spacer element interchanged, and illustrating in broken lines a cutting tool in position with respect to the tooth rest and the grinding wheel during grinding of the cutting edge of one flute of a small left-hand helically fluted cutter;

Fig. 4 is a fragmentary perspective view of the tooth rest carrying portion of the grinder head shown in Fig. 3 and as viewed in a direction facing the annular working face of the grinding wheel; the wheel dressing device being omitted;

Fig. 5 is a perspective view of the dual finger type of blade structure of the tooth rest employed with the cutter grinder head shown in Figs. 1 to 4 inclusive, and arranged to be optionally interchangeable with its associated spacer element on the support means to accommodate the grinding of left and right hand helically fluted cutters;

Fig. 6 is a fragmentary perspective view of the tooth rest carrying portion of the Fig. 1 cutter grinder head and shown similar to Fig. 4 but illustrating another form of dual finger type of tooth rest optionally positionable on the support means and arranged for supporting and guiding the cutting edges of a left-hand helically fluted cutting tool during a grinding operation thereon;

Fig. 7 is a fragmentary perspective view similar to Fig. 6 but showing the tooth rest arranged for engaging and guiding the cutting edges of a right-hand helically fluted cutting tool during grinding;

Fig. 8 is a perspective view of the modified tooth rest element employed with the cutter grinder head as arranged thereon in Figs. 6 and 7; and Figs. 9, 10, 11 and 12 are pictorial views of a set of alternate forms of tooth rests separately adapted to be inerchangeable with the spacer element and optionally positionable on the tooth rest support means in accordance with the present invention.

Figure 1:
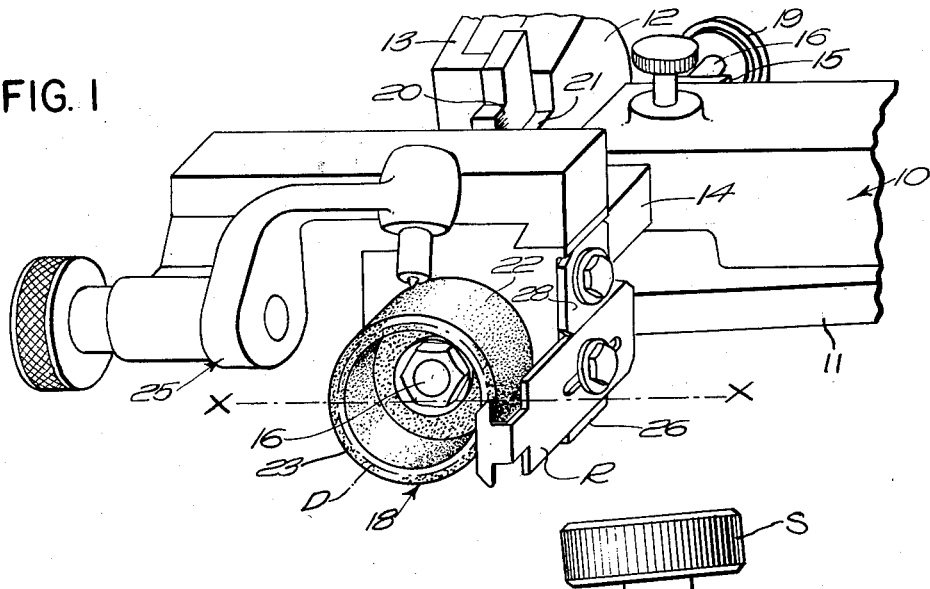
Fig. 1 is a fragmentary perspective view of the forward end portion of a cutter grinder head assembly embodying one form of tooth rest arrangement which is the subject of the present invention, and illustrating the tooth rest member in operative position to the working face of the grinding wheel.
Figure 2:
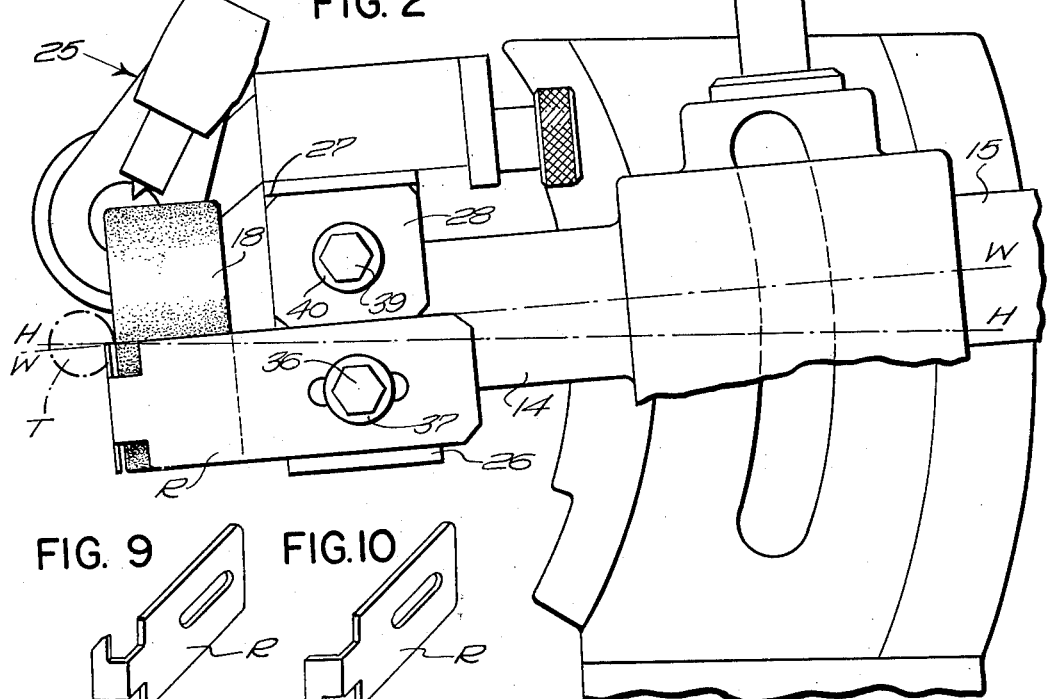
Fig. 2 is a side elevation, partly in section and on larger scale, of the tooth rest carrying portion of the grinder head assembly shown in Fig. 1 and as viewed toward the left, illustrating in broken lines a cutting tool in position with respect to the tooth rest and the grinding wheel during grinding of the cutting edge of one flute of a small right-hand helically fluted cutter.
Figure 2:
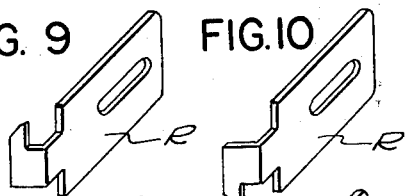
Figure 2:
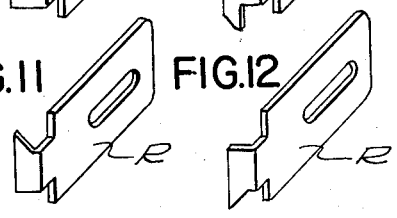
Figure 2:
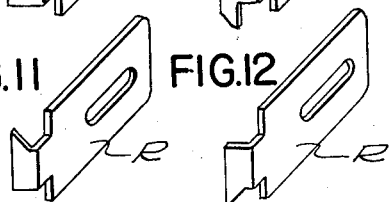

Referring specifically to the drawings and in particular to Figs. 1 and 2 thereof illustrating the invention, there is shown in these figures a fragmentary portion of the grinding wheel head assembly of the cutter grinder disclosed and described in detail in my copending application, Serial No. 470,207 above-identified, the said head assembly including a grinding wheel slide 10 supported for angular adjustment in a vertical plane by means of a pair of interengaging upright arcuate-shaped machine slide members 12 and 13 which are fixed respectively to the wheel slide 10 and arm 11 of an elevatable carriage (not shown) arranged for manual adjustment vertically on the machine. The wheel slide 10 is provided with a pair of overhung arms 14 and 15 (see Fig. 1) having suitably journaled therein a rotatable wheel spindle 16 to which is attached at the forward end extremity thereof a grinding wheel 18 of proper size for cylindrically grinding the periphery teeth of straight and helical tooth cutters. The wheel spindle 16 extends laterally of the wheel slide 10 and it may be rotated from any suitable source of power, such as, for example, by means of a V-pulley 19 secured on the rear end and about which passes a V-belt (not shown) which is driven by a suitable V-pulley on the shaft of an electric motor (not shown) on the wheel slide 10. The arcuate slides 12 and 13 are provided respectively with a graduated scale 20 and a pointer 21 to facilitate the setting of the grinding wheel slide 10 angularly to grind the proper clearance angle on the cutting edges of the teeth or fluted portions of the cutting tool to be sharpened.

The grinding wheel 18 may be a cup wheel having either a straight or a flaring peripheral face 22 and preferably is provided, as shown in Figs. 1, 2 and 3 of the drawings, with an annular convexed end grinding face 23 opposite which is set in correct relation thereto the blade and guide finger of a suitable tooth rest R, as will be hereinafter described, for properly supporting and guiding the cutting edges of straight and helical toothed or fluted cutting tools while being ground and/or sharpened, and permitting the formation of definite clearance angles on all cutting edges.

To properly shape the annular convexedly-curved end face or rim 23 of the grinding wheel 18 so that it will be of the proper arcuate form with its crown opposite and aligned with the contact point of the guide finger of the tooth rest R and lying on a peripheral datum circle D extending medially around the annular operating face 23 of the wheel, I have shown a radius type dressing mechanism herein designated by the reference numeral 25 and of the construction disclosed in my copending application, Serial No. 470,207 above-identified, and employing a diamond dressing tool which is manually traversed across the end working face 23 of the wheel 18 in a circular path.

A cutting tool T required to be ground or sharpened, and depicted in broken outline in Fig. 2, is supported at one end for free rotation on a suitable work support (not shown) which is arranged to traverse the overhung tooth portion of the cutter T past the annular operating face 23 of the grinding wheel 18 in a direction so that the axis of the cutter T will be moved in a horizontal line at right angles to the axis of the wheel 18 and lying in a common plane containing both the wheel axis and the axis of the cutting tool T, viz. plane H—H, when the wheel grinding face 23 is set in a vertical plane.

According to my present invention, I provide a support for a tooth rest proximate to the grinding wheel and this support includes opposed positioning means spaced apart a distance wide enough to accommodate therebetween side-by-side in abutting contact therewith and with respect to each other a detachable tooth rest and a detachable spacer element. The spaced positioning means may be in the form of a wide channel, spaced guide bars, or spaced lugs; the opposed abutment-forming surfaces provided thereby being symmetrically disposed with respect to a line extending centrally and longitudinally thereof parallel to the axis of the grinding wheel and at right angles to and in the same plane of a horizontal line lying in a diametrical plane passing through the center of the grinding wheel and containing its axis.

The tooth rest employed may carry a dual guide finger type of blade shaped as shown in Figs. 5 and 8, or it may instead have a blade which carries a single guide finger and shaped, for example, in accordance with any of those illustrated in Figs. 9, 10, 11 and 12. Regardless of which of these types of blade formations is used the lentgh and disposition of the guide finger whose outermost extremity serves as the tooth contacting point thereof must, in any and all tooth rests utilized, terminate exactly at a point coincident with the aforesaid line of symmetry of said positioning means when such tooth rest is mounted in either of its alternative positions on the support between said positioning means and in association with its companion spacer element.

If desired, the main body portion of shank of the tooth rest and the spacer element contiguously associated with the tooth rest may be of substantially identical width thereby permitting them to be optionally interchanged in their positions beside each other in the guideway provided between the opposed positioning means on the support. In the arrangement just stated, the interface between the tooth rest and its companion spacer element will, in either of their alternative mounting positions on the support, coincide with the central longitudinal line which is contained in the diametrical plane above-described. Both the above-described tooth rest arrangements permit use of interchangeable tooth rests of either a dual guide finger formation or of one or more rests of the single guide finger type and in which the guide fingers have a predetermined length thus insuring that the terminal end edge or tooth-contacting point thereof will be accurately positioned and retained by said spaced positioning means in a substantially tangent relation to said plane in either of the alternative mounting positions of any of such rests on said support.

In carrying my invention into effect, I employ a vertically disposed support member for the tooth rest R and is here shown as an enlarged block-like body 26 disposed at the outer end portion of the forwardly extending overhung arm 14 of the wheel slide 10 proximate to the grinding wheel 18, and this block-like body 26 may be either attached to or be integral with the arm 14, or it may be independently supported at one side thereof. As illustrated in Figs. 1, 2 and 3, one side of the block-like body 26 is provided laterally thereof with a relatively wide channel 27 whose opposite sides present flat wall surfaces defining a longitudinal guideway into which are mounted the shank or body portion of certain tooth rests R, as will be presently described, interchangeable with each other and also with a plate-like spacer element 28. Two alternative forms of tooth rests R are shown in Figs. 5 and 8 adapted to be mounted in the channel 27 in contiguous relation to the spacer element 28 and, as here illustrated, each have flat substantially rectangular shank or body portions 30 and 30' of identical width and also are the same width as that of the spacer plate 28 whereby when the tooth rest and the spacer are disposed beside each other in abutting contact they fit snugly in the channel 27. The plate-like shanks 30 and 30' of these tooth rests may be of the same thickness as the spacer plate 28 and they carry at one end thereof relatively thin flat blades 31 and 31' respectively each being of generally trapezoidal shape disposed in a plane at right angles to the plane of the main body portions or shanks 30 and 30' of the respective tooth rests. The blades 31 and 31' are connected to their respective shanks 30 and 30' by centrally disposed web portions 32 and 32' of narrow width, so that the acute angled corner portions of the trapezoidal body which overhang and extend in opposite directions from these web connectors, and formed at the juncture of the angularly inclined side edges of the trapezoidal blade portion with the longer edge part thereof, define a pair of tooth-engaging guide fingers 34 and 35 and 34' and 35' respectively which extend transversely of the blades 31 and 31' and alternatively serve as tooth-contacting elements to engage behind and support a cutting edge of a cutting tool having straight or helically extending teeth or fluted portions during grinding thereof by the grinding wheel 18, as shown in Figs. 1, 2, 3, 4, 6 and 7. The tooth rests R are detachably secured in desired longitudinally adjusted positions in the channel 27 by means of a stud or screw 36 which carries a washer 37 and passes through longitudinal slots 38 or 38' at an intermediate portion of the shanks 30 or 30' of the tooth rests. The spacer plate 28 also is detachably secured in the channel 27 by means of a stud or screw 39 which carries a washer 40 and passes through a suitable central hole in the spacer element. It will be understood that by loosening the stud 36, the shanks 30 and 30' of the tooth rests R may be shifted longitudinally in the channel 27 for adjusting and setting the tooth contact point of the particular guide finger in use correctly and with the proper clearance with respect to the end working face 23 of the grinding wheel.

It will be understood that the grinding wheel slide 10 is mounted for angular adjustment in a vertical plane by means of a suitable hand screw S about a pivot center located on a horizontal line X—X which lies in a plane at right angles to the rotational axis of the grinding wheel spindle 16 and is substantially tangent with the working contact tip of the tooth rest R; said line also coincides with the line of intersection of said plane with both the horizontal plane H—H that contains the work axis, and a horizontal plane W—W which contains the grinding wheel axis when set in its various angularly adjusted positions (see Figs. 1, 2 and 3).

In sharpening helical bits or helical flute cutters with the machine and tooth rest arrangement above described and shown, the grinding wheel slide 10 may be set first to the proper clearance angle, such as for example, ten degrees from vertical. Then, the grinding wheel 18 is dressed by means of the radius wheel dressing device 25 to provide a convex grinding surface 23 on the annular end face of the grinding wheel 18. Prior to this dressing operation or at the completion thereof the proper size and hand of tooth rest R is mounted in proper position beside the spacer element 28 in the channel 27 of the block 26 carried by the grinding wheel slide 10, and before tightening its clamping stud, the tooth rest R is adjusted in the channel 27 to place the point of the particular guide finger in use close to the convex end grinding face 23 of the wheel 18 but without touching the wheel surface, i. e., approximately .010 of an inch, and also in juxtaposition with the datus circle D of the wheel. This may be done by means of the height gauge arrangement disclosed in my previous application, Serial No. 470,207 above-identified. When thus set, the tip of the tooth-contacting point of the active guide finger will lie in a plane containing the grinding wheel axis and the line X—X about which the grinding wheel slide 10 is angularly adjusted.

During the grinding operation on cutting tools, such as bits and cutters having helical or straight teeth or flutes, the bit or cutter required to be sharpended is first mounted by its shank in the reciprocating work support and preliminary to the grinding operation is brought close to the operating face of the grinding wheel with the lip of a particular tooth or flute to be ground engaged behind its cutting edge and supported by the contact point of the tooth rest R. The cutting tool T then is moved longitudinally of itself past the grinding wheel 18 while in engagement with the convexed end grinding surface 23 while the operator holds the cutting tool revolved in a direction to press the tooth or flute being ground against the contact point of the guide finger of the tooth rest when adjusted as just explained. In grinding helically fluted cutting tools, the tool, when thus arranged is moved lengthwise as it slides on the contact point of the guide finger, the helical lead of its cutting edge or lip will turn the cutting tool about its own axis in the work support, and consequently will bring successive portions of the particular helical flute being operated on by the operating face 23 of the grinding wheel 18 into the proper grinding plane while thus supported by the tooth rest and until the cutting tool stops turning when the end of the particular helical flute is reached. This procedure may be repeated several times for each tooth or flute, and until all the lips of all of the cutting tool have been ground and sharpened. The helical bits or cutting tools to be ground can be of any axial length, four inches being usually the maximum limit for router bits. The size, angle and hand of helix of the tooth-engaging guide fingers 34 and 35, and 34' and 35' of the tooth rests R will, of course, depend upon the hand and angularity of the twist or lead of the helical cutting edge of the particular cutting tool to be ground and, in practice, many possible combinations of helix and hand of cut are possible so that a set formed of a number of appropriate hands of interchangeable tooth rests may be used to meet the various requirements of helical flute bits and cutters operated upon by the grinding machine. In the case of straight fluted cutters the operator will manually maintain the lip of the particular tooth or flute being ground in continuous engagement with the active tooth guiding finger of the particular tooth rest in use but in the absence of a helical lead on the flutes there will be no progressive revolving of the cutting tool.

In view of the foregoing description, it will be seen that I have provided an improved tooth rest arrangement for cutter grinding machines adapted for properly supporting the cutting edges of cutting tools provided with either straight or helically toothed portions, and I have further provided a mounting for the tooth rest wherein a support is located proximate to and at one side of the grinding wheel in which a tooth rest may be optionally positioned in either of two contiguous locations on the support for properly and accurately positioning the tooth guiding finger of the rest according to the type of teeth formed on the cutting tool required to be ground and/or sharpened.

While I have described several forms of my invention, it is to be understood that various modifications and changes in form and details of construction may be made therein within the range of engineering skill without departing from the spirit and scope of the invention as defined in the appended claims, and it is therefore my intention not to limit my invention in any manner whatsoever except by the terms and scope of the appended claims.

What is claimed is:

1. In combination, a grinding wheel, a support for a tooth rest proximate to said grinding wheel and including opposed spaced positioning means for mounting therebetween side by side in abutting relation therewith a tooth rest and a spacer element, said positioning means being symmetrically disposed with respect to a line extending longitudinally thereof and at right angles to a horizontal line with both of said lines lying in a diametrical plane passing through the center of the grinding wheel and containing its axis; an adjustable tooth rest detachably mounted between said positioning means, said tooth rest having a blade portion formed with a tooth-contacting guide finger whose outer extremity terminates at a point coincident with said line of symmetry of said positioning means when the tooth rest is mounted therein in a predetermined adjusted position and said guide finger has proper disposition to the operating face of the grinding wheel to engage behind and guide the cutting edge of a cutting tool during grinding by said wheel; and a spacer element detachably mounted between said positioning means in contact with the latter and the tooth rest, said tooth rest and said spacer element being optionally interchangeable in their positions beside each other between said positioning means of the support to accommodate the alternative mounting therebetween of various tooth rests having blades with oppositely directed tooth-guiding fingers of identical length whereby the tooth-contacting point thereof will be accurately positioned and held by said spaced positioning means in substantially a tangent relation to said plane in either of the alternative mounting positions of such tooth rests on said support.

2. In combination, a grinding wheel, a support for a tooth rest proximate to said grinding wheel and including spaced apart guideway means for mounting and supporting therebetween side by side in abutting relation a tooth rest and a spacer element, said guideway means being symmetrically disposed with respect to a line extending centrally and longitudinally thereof parallel to the axis of said grinding wheel and also at right angles to and in the same plane of a horizontal line lying in a diametrical plane passing through the center of the grinding wheel and containing its axis; an adjustable tooth rest detachably mounted between said guideway means, said tooth rest having a blade portion formed with a tooth-contacting finger whose outer extremity terminates at a point coincident with said line of symmetry of said guideway means when the tooth rest is mounted therein in a predetermined adjusted position and said blade finger has spaced confronting disposition to the operating face of the grinding wheel; and a spacer element detachably mounted between said guideway means in contact with the latter and the tooth rest, said tooth rest and said spacer element being optionally interchangeable in their positions beside each other in said guideway means of the support to accommodate the alternative mounting therein of various tooth rests having blades with oppositely directed tooth-guiding fingers of identical length whereby the tooth-contacting tip thereof will be accurately positioned and supported by said guideway means in a substantially tangent relation to said plane in either of the alternative mounting positions of such tooth rests on said support.

3. In combination, a grinding wheel, a support for a tooth rest proximate to said grinding wheel, one side of said support being formed with a relatively wide channel extending laterally thereof, the opposite side walls of said channel being symmetrically disposed with respect to a line extending centrally and longitudinally of the channel parallel to the axis of the grinding wheel and also at right angles to and in the same plane of a horizontal line lying in a diametrical plane passing through the center of the grinding wheel and containing its axis; an adjustable tooth rest detachably mounted in said channel; a spacer element detachably mounted in said channel beside and in contact with said tooth rest longitudinally thereof along the aforesaid central longitudinal line of said channel, said tooth rest and said spacer element thus arranged also being in contact longitudinally with the opposed side walls of said channel, said tooth rest and said spacer element being optionally interchangeable in their positions beside each other in said channel to accommodate the alternative mounting therein of tooth rests having blades with oppositely directed tooth-guiding fingers of identical length whereby the tooth-contacting tip thereof will be accurately positioned and retained by the walls of said channel in a substantially tangent relation to said plane in either of the alternative mounting positions of such tooth rests on said support.

4. The combination in a cutter grinding machine having a rotatable grinding wheel, of a support for a tooth rest proximate to said wheel and provided with a wide channel the longitudinal axis of which is disposed at right angles to a horizontal line lying in a diametrical plane passing through the center of the grinding wheel and containing its axis; an adjustable tooth rest detachably mounted in said channel and guided by one wall thereof, said tooth rest having a blade portion formed with oppositely-directed tooth-guiding fingers for disposition opposite the operating surface of said grinding wheel and also having an elongated body portion at right angles to the said blade for mounting in said channel; and a spacer element detachably mounted in said channel beside and in contact with the tooth rest body portion and the other wall of said channel, said tooth rest body portion and said spacer element being adapted to be optionally interchangeable in their positions beside each other in said channel, and the fingers being of a predetermined length whereby in either of the alternative mounting positions of the tooth rest in said channel the tooth contact point of the particular finger element extended nearest the spacer element will be accurately positioned by said channel and said spacer element in a substantially tangent relation to said plane irrespective of any changes made in adjustment of the cutting tool and/or of the grinding wheel.

5. The combination in a cutter grinding machine having a rotatable grinding wheel of a support for a tooth rest proximate to said wheel and provided with a wide channel the longitudinal axis of which is disposed at right angles to a horizontal line lying in a diametrical plane passing through the center of the grinding wheel and containing its axis; an adjustable tooth rest detachably mounted in said channel and guided by one wall thereof, said tooth rest having a blade portion formed with two oppositely-extending tooth-guiding fingers of equal length from the center of the blade and also having a flat elongated body portion at right angles to the said blade for mounting in said channel; and a plate-like spacer element detachably mounted in said channel beside and in contact with the tooth rest body portion and the other wall of said channel, said tooth rest body portion and said spacer element being identical in width and optionally interchangeable in their positions beside each other in said channel whereby in either of the alternative mounting positions of the tooth rest in said channel the terminal end edge of the particular finger element extended nearest the spacer element will be accurately positioned by said channel and said spacer element in a substantially tangent relation to said plane.

6. A tooth rest comprising an elongated plate-like body having at one of its ends a thin flat blade portion of generally trapezoidal shape disposed in a plane at right angles to the plane of said body and connected thereto by a central web portion of narrow width, the oppositely extending acute angled corner portions of said trapezoidal blade portion overhanging said web and formed at the juncture of the angularly-inclined side edges of said trapezoid blade portion with the longer edge part thereof being adapted to serve alternatively as tooth-contact elements to engage behind a tooth of a cutting tool and support the tooth in operative relation to a grinding wheel during grinding of the tooth by the grinding wheel when said tooth rest is held by a support with said blade positioned in confronting relationship with the operating face of the grinding wheel.

7. A tooth rest comprising an elongated plate-like body slotted longitudinally at an intermediate portion thereof and carrying at one of its ends a relatively thin flat blade portion of generally trapezoidal shape disposed in a plane at right angles to the plane of said body and connected thereto by a narrow web portion, the opposed acute-angled corner portions of said trapezoidal blade portion overhanging the web and symmetrically disposed thereto and formed at the juncture of the angularly-inclined side edges of said trapezoidal blade portion with the longer edge part thereof alternatively serving as tooth-contact elements to engage behind a tooth of a cutting tool and support the tooth in operative relation to a grinding wheel during grinding of the tooth by the grinding wheel when said tooth rest is held by a support with said blade positioned in confronting relationship with the operating face of the grinding wheel.

8. A tooth rest comprising a main plate-like elongated body having a relatively thin flat blade portion at one end disposed at right angles to the plane of said body and so disposed whereby the tooth rest may be mounted and supported alongside and in spaced parallel relation to a cup-shaped grinding wheel with said blade portion disposed in close proximity to and extending across the rim edge of the annular end working face of said grinding wheel, said blade portion terminating in a trapezoidal-shaped head connected to said main body of the tooth rest by a web portion of less width and from either side of which said head extends in opposite directions to form a pair of fingers the outer extremities of which alternatively serve as tooth contacting elements to engage behind and support a cutting edge of a cutting tool having straight or helically extending teeth during grinding thereof by the grinding wheel.

No references cited.